Patented Jan. 29, 1946

2,393,820

UNITED STATES PATENT OFFICE 2,393,820

METHYLAMINOMETHYL-(3 - AMINO- 4 - HYDROXY-PHENYL)-CARBINOL AND SALTS THEREOF

Otto Schnider, Basel, Switzerland, assignor to Hoffmann-La Roche Inc., Nutley, N. J., a corporation of New Jersey No Drawing. Application January 6, 1944, Serial No. 517,246. In Switzerland June 24, 1943

4 Claims. (Cl. 260—570.6)

Methylaminomethyl - (3 - amino - 4 - hydroxyphenyl)-carbinol, its N-acyl derivatives and their salts have proved to be compounds exerting the full action of adrenalin, while being well tolerated and having a marked stability.

The new compounds correspond to the following general formula:

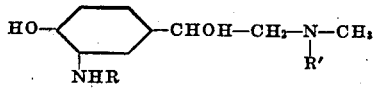

R and R' represent hydrogen or an acyl radical.

In this compound there are 4 groups lending themselves to the formation of salts, i. e., the 2 hydroxyl groups and the 2 amino groups, provided the latter are not substituted by acyl radicals. It will thus be recognised that unsubstituted amino compounds may form salts with a great variety of acids, such as inorganic acids, for instance hydrogen halides, and organic acids, such as tartaric acids and others; of the 2 hydroxyl groups, the aromatic hydroxyl group is particularly capable of forming salts, by substituting the hydrogen by metals especially alkali metals.

3-amino-4-hydroxy-omega-methylamino - acetophenone and its salts are suitable starting materials for the manufacture of the said compounds. The salts of the said 3-amino-4-hydroxy-omega-methylamino-acetophenone are either directly subjected to reduction or initially converted into their N- or N,N'-acyl derivatives in a suitable manner and then hydrogenated. In this way, the desired salts of the compounds of the above formula are obtained. If 3-amino-4-hydroxy-omega-methylamino-acetophenone is reduced in presence of an optically active acid, e. g., tartaric acid, salts of optically active bases can be directly obtained. By choosing an N,N'-diacylated 3-amino-4-hydroxy-omega-methylamino-acetophenone as starting material, N,N'-diacyl compounds are obtained as a result which are themselves easily water-soluble and which are no longer capable of forming salts with acids, but are able to do so with bases.

The new compounds are to be employed as medicinal preparations.

Example 1

A solution of 291 parts by weight of 3-amino-4 - hydroxy-omega-methylamino-acetophenone-tartrate of the formula $C_9H_{12}O_2N_2 \cdot 1/2$ tartaric acid $\cdot 2H_2O$ (melting point 182–183° C.; prepared, for instance, by catalytic hydrogenation of 3-nitro-4-hydroxy-omega-methyl-benzyl-amino-acetophenone in presence of tartaric acid with palladium and hydrogen) in 3000 parts of water is treated with 225 parts by weight of d-tartaric acid and 15 parts by weight of platinum oxide. When vigorously stirred or shaken, the calculated quantity of hydrogen is taken up in about 2 hours under a gauge pressure of 0.2 atm. The product is then separated from the platinum and the almost colourless solution concentrated in vacuo to about 550 parts by volume. The solution is now treated with alcohol until it begins to become turbid, seed crystals are added and the whole is allowed to stand for 24 hours. The practically quantitatively precipitated 1-(+)-methylaminomethyl- (3-amino-4-hydroxy-phenyl)-carbinol-tartrate is sucked off, for the purpose of complete purification dissolved in double the quantity of water, decolourised with a little animal charcoal and treated with alcohol until it becomes turbid. After 24 hours, the now pure white crystals are sucked off and dried.

1 - (+) - methylaminomethyl -(3-amino-4-hydroxy - phenyl) - carbinol - tartrate melts at 150–151° C. It has a rotation of $[\alpha]_D^{17}=+3.4°$ for $c=5$ in water. The hydrochloride prepared from the tartrate has a rotation of $[\alpha]_D^{20}=-35.2°$ for $c=1.7$ in water.

If 3- amino-4-hydroxy - omega - methylamino-acetophenone-hydrobromide is hydrogenated under otherwise the same conditions, methylaminomethyl-(3- amino -4- hydroxy-phenyl)-carbinol-hydrobromide is obtained as an easily water-soluble oil which does not solidify and which has a slight yellow colouring. The colourless dihydrobromide melts at 235° C. with decomposition.

Example 2

A solution of 261 parts by weight of 3-amino-4-hydroxy-omega-methylamino - acetophenone-hydrobromide in 500 parts of water is vigorously stirred. 204 parts by weight of acetic anhydride are added in one lot, whereupon evolution of heat occurs immediately. After a short while, crystals begin to separate. The reaction is proceeded with by continual stirring and terminated when the temperature has dropped to room-temperature. The product is sucked off, dissolved in little warm water and allowed to crystallise. The colourless 3-acetamino-4-hydroxy-omega-methylamino - acetophenone - hydrobromide melts at 236–238° C. It is rather difficultly soluble in cold water.

303 parts by weight of this salt are shaken in 1000 parts of water under a gauge pressure of 0.2 atm. in presence of 20 parts by weight of platinum oxide in a hydrogen atmosphere. After about 3 hours, the calculated quantity of hydrogen has been taken up. The product is separated from the catalyst and evaporated to dryness in vacuo at a maximum temperature of 40° C. The residue is dissolved in double the quantity of warm methanol and treated with ether until turbidity sets in. After cooling down, the thick crystal mash is sucked off and dried. The methylaminomethyl - (3 - acetamino- 4 -hydroxy-phenyl) -carbinol-hydrobromide melts at 187–188° C. It is easily soluble in water and alcohol, difficultly soluble in ether and benzene.

Example 3

291 parts by weight of 3-amino-4-hydroxy-omega-methylamino-acetophenone-tartrate are dissolved in 600 parts of warm water. After cooling, 306 parts by weight of acetic anhydride are added in one lot while vigorously stirring. The reaction occurs immediately with evolution of heat. The acetylated product soon precipitates. After about 2 hours, the product is well cooled, then filtered by suction and washed with water. The 3-acetamino-4-hydroxy-omega-acetylmethyl-amino-acetophenone is difficultly soluble in water and the usual organic solvents. It is easily soluble in hot glacial acetic acid. Therefrom or by recrystallising from aqueous soda or alkalis and precipitation with carbondioxide or acetic acid it can be obtained in a completely colourless state. It melts at 249–250° C.

264 parts by weight of this compound are dissolved in 2000 parts by volume of a normal aqueous solution of ammonia while stirring. 20 parts by weight of platinum oxide are added to this solution and treated with hydrogen under a gauge pressure of 0.2 atm. at room temperature while shaking. When the calculated quantity of hydrogen has been taken up, the product is separated from the catalyst, weakly acidified with 3 n acetic acid and evaporated to dryness. A sirup remains which gradually solidifies completely. By suspension with a little water, it is separated from ammonium acetate. The remaining acetyl-methylaminomethyl-(3 -acetamino - 4 - hydroxyphenyl) -carbinol is dissolved in double the quantity of warm water and allowed to crystallise. It melts at 154–155° C. and is easily soluble in water.

I claim:

1. Methylaminomethyl-( 3 -amino- 4 -hydroxyphenyl) -carbinol-hydrobromide.
2. A substance selected from the group consisting of methylaminomethyl-(3-amino-4-hydroxyphenyl) -carbinol and the salts thereof.
3. Methylaminomethyl-(3 - amino- 4 -hydroxyphenyl) -carbinol-tartrate.
4. Methylaminomethyl-(3 - amino- 4 -hydroxyphenyl) -carbinol-hydrochloride.

OTTO SCHNIDER.